United States Patent
Roberts et al.

(10) Patent No.: US 6,614,579 B2
(45) Date of Patent: Sep. 2, 2003

(54) PROXIMITY SWITCH AND VEHICLE REARVIEW MIRROR ASSEMBLY INCORPORATING THE SAME AND HAVING A TRANSPARENT HOUSING

(75) Inventors: John K. Roberts, East Grand Rapids, MI (US); Jeremy A. Fogg, Holland, MI (US); Frederick T. Bauer, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 229 days.

(21) Appl. No.: 09/900,500

(22) Filed: Jul. 6, 2001

(65) Prior Publication Data

US 2002/0024713 A1 Feb. 28, 2002

Related U.S. Application Data (63) Continuation-in-part of application No. 09/425,792, filed on Oct. 22, 1999, now Pat. No. 6,441,943.
(60) Provisional application No. 60/242,465, filed on Oct. 23, 2000, and provisional application No. 60/216,297, filed on Jul. 6, 2000.

(51) Int. Cl.[7] .......................... G02F 1/153; G02B 5/08; G02B 7/182; B60R 1/12; F21S 8/10
(52) U.S. Cl. ...................... 359/267; 359/265; 359/275; 359/838; 359/839; 359/841; 359/872; 362/494; 362/545; 362/460; 348/148; 340/815.4; 250/208.1
(58) Field of Search .................. 359/265, 267, 359/272, 275, 838, 839, 841, 842, 872; 362/494, 545, 140, 460, 486; 348/148, 438; 340/815.4, 525, 602, 375; 250/208.1, 214

(56) References Cited

U.S. PATENT DOCUMENTS

| | | | |
|---|---|---|---|
| 5,303,130 A | | 4/1994 | Wei et al. ................... 362/494 |
| 6,011,518 A | | 1/2000 | Yamagishi et al. ......... 343/713 |
| 6,049,271 A | | 4/2000 | Chu ........................... 340/463 |
| 6,087,953 A | * | 7/2000 | DeLine et al. ............ 340/815.4 |
| 6,111,683 A | * | 8/2000 | Cammenga et al. ........ 359/267 |
| 6,124,886 A | * | 9/2000 | DeLine et al. .............. 348/148 |
| 6,139,172 A | * | 10/2000 | Bos et al. .................... 362/494 |
| 6,152,590 A | * | 11/2000 | Furst et al. ................. 362/545 |
| 6,172,613 B1 | * | 1/2001 | DeLine et al. ........... 340/815.4 |
| 6,206,553 B1 | * | 3/2001 | Boddy et al. ............... 362/494 |
| 6,262,831 B1 | * | 7/2001 | Bauer et al. ................ 359/265 |
| 6,276,821 B1 | * | 8/2001 | Pastick et al. .............. 362/494 |
| 6,356,376 B1 | * | 3/2002 | Tonar et al. ................ 359/267 |

FOREIGN PATENT DOCUMENTS

EP      0972680      7/1999

\* cited by examiner

*Primary Examiner*—Loha Ben
(74) *Attorney, Agent, or Firm*—Price, Heneveld, Cooper, DeWitt & Litton (57) ABSTRACT

According to one embodiment, a proximity switch comprises a radiation emitter for emitting radiation, at least one photosensor for detecting light levels near the radiation emitter, and an electronic circuit for energizing the radiation emitter and for receiving and processing signals from the photosensor so as to perform a specified function upon detecting an object that causes the radiation emitted from the radiation emitter to be reflected back to the photosensor. According to another embodiment, a rearview assembly for a vehicle comprises a transparent housing.

71 Claims, 5 Drawing Sheets

PROXIMITY SWITCH AND VEHICLE REARVIEW MIRROR ASSEMBLY INCORPORATING THE SAME AND HAVING A TRANSPARENT HOUSING

CROSS-REFERENCE TO RELATED APPLICATIONS

This application claims priority under 35 U.S.C. §119(e) on U.S. Provisional Application No. 60/242,465 entitled VEHICLE REARVIEW MIRROR ASSEMBLY INCORPORATING A COMMUNICATION SYSTEM, filed on Oct. 23, 2000, by Robert R. Turnbull et al., and on U.S. Provisional Application No. 60/216,297 entitled VEHICLE REARVIEW MIRROR ASSEMBLY INCORPORATING A COMMUNICATION SYSTEM, filed on Jul. 6, 2000, by Robert R. Turnbull et al., the entire disclosures of which are hereby incorporated by reference.

This application is also a continuation-in-part of U.S. patent application Ser. No. 09,425,792 entitled INDICATORS AND ILLUMINATORS USING A SEMICONDUCTOR RADIATION EMITTER PACKAGE, filed on Oct. 22, 1999, by John K. Roberts et al., now U.S. Pat. No. 6,441,943, the entire disclosure of which is incorporated herein by reference.

BACKGROUND OF THE INVENTION

The present invention generally relates to a rearview mirror assembly for a vehicle, proximity switches, and light modules, and more particularly to light modules for vehicles.

Preexisting illuminators and other devices, specifically those located in a vehicle, typically utilize manual switches that require manual contact for the illuminator or device to be activated. The requirement for manual contact presents several drawbacks. First, manual contact requires that an operator know and/or see the switch location precisely. This may be difficult at best during nighttime conditions or when the buttons are not easily seen by the operator. This can frequently happen in an automobile where switches may be relatively small to accommodate multiple functions and where the switch location is such that the driver must divert his or her eyes from the road ahead. When the device to be activated is an illuminator, it may generally be assumed that the illuminator is only being activated because of the low light conditions that are present. Thus, switches for illuminators are inherently difficult to locate and activate.

Another problem associated with manual switches is the significant increased probability of static discharge into the electronic circuit to which the switch is connected. Another problem with switches requiring manual contact is that they accumulate debris and can transmit germs from one operator to another. The accumulated debris may also come between the electrical contacts and thus affect the reliability of the switch.

Switches that require mechanical movement and contact, which include electromechanical switches, membrane switches, etc., are prone to wear and are often the most unreliable portion of an electronic system. Also, many switch types do not function very well in a high moisture environment or in the presence of frost, as would occur in many vehicles. An additional problem with such switches is that most of the switch types are costly to make and difficult and costly to assemble into conventional circuit assemblies compared to the cost of incorporating other standard electronic components. Further, manual switches require an ordinate focus/concentration distracting operators from safely executing their primary task.

Vehicle rearview mirror assemblies typically include an opaque housing. When optical elements in addition to the mirror are provided in such opaque housings, the housings typically include a plurality of apertures for the passage of light into or out from the housing. Such apertures generally provide sites of potential ingress of moisture thereby often requiring a transparent cover to be secured across the aperture. Such covers add to the cost and complexity of the rearview mirror assembly.

SUMMARY OF THE INVENTION

The present invention overcomes these problems by enabling an operator to activate an electronic component, such as an illuminator, simply by waving his or her hand or another object in the proximity of the device. The present invention further provides for an inexpensive switching mechanism. The present invention is particularly well suited for use in a rearview mirror assembly incorporating any form of illuminator.

To achieve these and other aspects and advantages, the proximity switch of the present invention comprises a radiation emitter for emitting radiation, at least one photosensor for detecting light levels near the radiation emitter, and an electronic circuit for energizing the radiation emitter and for receiving and processing signals from the photosensor so as to perform a specified function upon detecting an object that causes the radiation emitted from the radiation source emitter to be reflected back to the photosensor. The function that the electronic circuit may perform may be to activate an illuminator assembly or other device. While the most preferred embodiment is to incorporate the invention in a rearview mirror assembly, the present invention may be implemented in other places of a vehicle to activate interior illumination as may be provided through map lamps, dome lamps, door lights, etc. Additionally, the present invention may be employed to activate a puddle lamp or an approach lamp in or adjacent the outside mirror of a vehicle, as well as back-up lamps, etc. The invention could also be incorporated in outdoor security lamps, porch lamps, overhead street lamps, and the like. The present invention could further be incorporated in virtually any form of illuminator or other electronic device.

According to another embodiment of the present invention, a vehicle illuminator system is provided that comprises: a lamp module for emitting light and configured for mounting to a vehicle; a radiation emitter for emitting radiation; at least one photosensor for detecting light levels near the radiation emitter; and an electronic circuit for energizing the radiation emitter and for receiving and processing signals from the photosensor so as to cause the lamp module to emit light upon detecting an object that causes the radiation emitted from the radiation emitter to be reflected back to the photosensor.

According to another embodiment of the present invention, a rearview assembly for a vehicle is provided that comprises: a mounting structure adapted to be mounted to a vehicle and including a housing; rearward viewing means for providing a rearward view to a vehicle occupant; a light module disposed in the housing; a radiation emitter for emitting radiation; at least one photosensor for detecting light levels near the radiation emitter; and an electronic circuit for energizing the radiation emitter and for receiving and processing signals from the photosensor so as to cause the light module to emit light upon detecting an object that causes the radiation emitted from the radiation emitter to be reflected back to the photosensor.

According to another embodiment of the present invention, an interior rearview assembly for a vehicle is provided that comprises: a mounting structure configured to be secured to the vehicle in proximity to an upper portion of a windshield of the vehicle; a transparent housing supported on the mounting structure, the transparent housing being transparent to visible light; and rearward viewing means for providing a rearward view to the driver of the vehicle, the rearward viewing means being supported by the transparent housing.

According to another embodiment of the present invention, a rearview assembly for a vehicle is provided that comprises: a mounting structure configured to be secured to the vehicle; a transparent housing supported on the mounting structure, the transparent housing being transparent to infrared light; rearward viewing means for providing a rearward view to the driver of the vehicle, the rearward viewing means being supported by the transparent housing; and an infrared data interface disposed in the transparent housing for enabling wireless communication with an electronic device within the vehicle.

According to another embodiment of the present invention, a rearview assembly for a vehicle is provided that comprises: a mounting structure configured to be secured to the vehicle; an optically transparent housing supported on the mounting structure; rearward viewing means for providing a rearward view to the driver of the vehicle, the rearward viewing means being supported by the transparent housing; and an image sensor disposed in the transparent housing, wherein the transparent housing is transparent to the radiation to which the image sensor is sensitive.

According to another embodiment of the present invention, a rearview assembly for a vehicle is provided that comprises: a mounting structure configured to be secured to the vehicle; an optically transparent housing supported on the mounting structure; rearward viewing means for providing a rearward view to the driver of the vehicle, the rearward viewing means being supported by the transparent housing; and information provided within the transparent housing that is readable by one or both of a machine reading device and a human from outside the transparent housing.

According to another embodiment of the present invention, a rearview assembly for a vehicle is provided that comprises: a mounting structure configured to be secured to the vehicle; an optically transparent housing supported on the mounting structure; rearward viewing means for providing a rearward view to the driver of the vehicle, the rearward viewing means being supported by the transparent housing; an optical element disposed within the transparent housing and having an optical axis; and a lens integrally formed in the transparent housing, wherein the optical element is disposed with its optical axis passing through the lens.

According to another embodiment of the present invention, a rearview assembly for a vehicle is provided that comprises: a mounting structure configured to be secured to the vehicle; an optically transparent housing supported on the mounting structure, the transparent housing including a plurality of integrally molded strengthening ribs; rearward viewing means for providing a rearward view to the driver of the vehicle, the rearward viewing means being supported by the transparent housing; and an optical element disposed within the transparent housing and having an optical axis.

According to another embodiment of the present invention, a rearview assembly for a vehicle is provided that comprises: a mounting structure configured to be secured to the vehicle; a housing supported on the mounting structure; rearward viewing means for providing a rearward view to the driver of the vehicle, the rearward viewing means being supported by the housing; and a laser radar detector provided in the housing, wherein at least one of the housing and the rearward viewing means is at least partially transparent to wavelengths of light to which the laser radar detector is sensitive.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts.

The present invention and its various aspects are generally described as being implemented in a vehicle rearview assembly, and more particularly in a vehicle rearview mirror assembly. The term "rearview assembly" is utilized to generally describe a structure that is adapted to be mounted in the vehicle in proximity to an upper portion of the vehicle windshield to provide a view to the rear of the driver and generally the rear of the vehicle. Such rearview assemblies incorporate "rearward viewing means" for providing a rearward view to a vehicle occupant (generally the driver). Although such "rearward viewing means" typically includes a mirror, such structures may alternatively or additionally incorporate other "rearward viewing means" such as a display that displays an image taken from a rearward facing camera as disclosed in U.S. Pat. No. 5,670,935 and in commonly assigned U.S. patent application Ser. No. 09/153,654 entitled SYSTEMS AND COMPONENTS FOR ENHANCING REAR VISION FROM A VEHICLE filed on Sep. 15, 1998, by Frederick T. Bauer et al., now U.S. Pat. No. 6,550,949, the entire disclosures of the above patent and patent application are hereby incorporated by reference. Thus, as used herein, the term "rearward viewing means" shall include mirrors, displays, and any other structure for displaying or otherwise providing a rearward view to the driver or other occupant(s) of the vehicle.

The rearview assembly of the present invention may include various manual switches, light sensors, illuminator assemblies, indicator lights, and other electronics. The following aspect of the present invention pertains to a new mechanism for activating a functional feature without manually activating a manual switch. This aspect of the invention may be integrated with existing sensors and may also be used to allow user input to be received by the rearview assembly and to activate a function in response to such user input, such as turning on or off the vehicle map lights. Specifically, this aspect pertains to a proximity switch that may be provided in a rearview assembly or in any other vehicle accessory or component.

Figure 1:
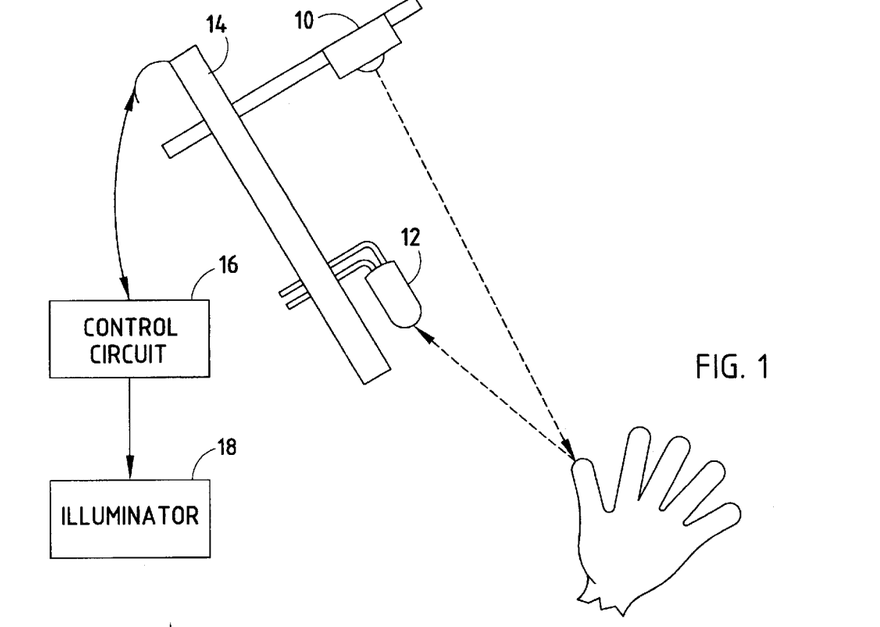
FIG. 1 is a side view of a proximity detector constructed in accordance with the present invention.

FIG. 1 shows an example of the proximity switch of the present invention. As illustrated, the device includes a radiation emitter 10 and a photosensor 12, which may be mounted to a common circuit board 14. Radiation emitter 10 and photosensor 12 are positioned such that radiation emitted from radiation emitter 10 is projected into an area of space where the proximity of an object within that area will cause the radiation to be retro-reflected or back-scattered towards photosensor 12. In the absence of such an object, photosensor 12 would not detect light levels of sufficient intensity so as to exceed a threshold level established by a control circuit 16. Control circuit 16 is coupled to at least the photosensor for receiving and processing the output signal from the photosensor. Control circuit 16 may also be utilized to selectively energize radiation emitter 10, as discussed further below.

Control circuit 16 may be coupled to a device, such as an illuminator 18. In this manner, control circuit 16 may send a signal to illuminator 18 or otherwise energize illuminator 18 when an object passes through the predefined space in which photosensor 12 may detect the object.

Radiation emitter 10 may project visible or invisible radiation, such as infrared (IR) or ultraviolet (UV) light. Additionally, radiation emitter 10 may be a separate component from illuminator 18. Alternatively, emitter 10 may be a part of an illuminator 18. Preferably, semiconductor 10 is a part of illuminator 18 that emits visible light. Radiation emitter 10 may be an LED, light emitting polymer (LEP) device, or another semiconductor optical emitter. Illuminator 18 preferably includes at least radiation emitter 10, and may include other light sources and preferably includes LEDs, LEPs, or other semiconductor optical emitters. Radiation emitter 10 and illuminator 18 may together or separately include light sources that emit monochrome red, amber, green, blue-green, blue, or orange light. Alternatively, they may emit white light and include a binary complementary pair or group of LEDs; a red, green, blue (RGB) group of LEDs; an InGaN LED incorporating a phosphor; or other white-light emitting combination of light sources.

Photosensor 12 preferably is a silicon sensor such as a photodiode, a phototransistor, or an active pixel sensor (APS). Photosensor 12 may be dedicated solely for use with the proximity detection function of the present invention or it may serve multiple functions. When implemented in an electrochromic mirror, for example, the photosensor may be an APS sensor with a primary function as a glare sensor for the electrochromic mirror and the secondary function as part of the proximity detection mechanism of the present invention.

Radiation emitter 10 and photosensor 12 are preferably mounted on or in a common housing or other support assembly, along with some electrical connector mechanism for enabling the sensor and light source to be coupled to control circuit 16. Control circuit 16 may be mounted on or in the same housing or support assembly or may optionally be contained in a remote housing. Conceivably, part of the control circuit may be included in the same housing as radiation emitter 10 and photosensor 12 while the remaining portion may be positioned in a remote location. Control circuit 16 may also be mounted on the same printed circuit board 14 as radiation emitter 10 and photosensor 12.

The housing or support assembly in which the components are mounted preferably would include one or more openings or apertures through which the light source may emit radiation and the sensor may receive radiation. Optionally, these apertures may be covered by a lens or cover that is substantially transparent to the operating band of radiation of the respective emitter or sensor. Such a lens or cover may include a filter, diffuser, or other optical moderating element. Alternatively, the housing, openings, and lens cover may be made integral of a single material substantially transparent to the operating band of radiation of the emitter and sensor.

The function of the proximity detection components is to initiate a function (i.e., energize illuminator 18) upon detection of an external event such as the passing of an operator's hand nearby the sensor 12. Control circuit 16 may apply power to illuminator 18 upon detection of the external event and continue to apply the power until a prescribed condition occurs whereupon the illuminator 18 is de-energized. Such prescribed conditions may include lapse of a predetermined time period (i.e., a "timeout") or the detection of a second instance of proximity. A combination of "secondary proximity termination" and "timeout" may also be employed. Other inputs, such as a signal indicating that the doors have been locked remotely (by RKE interface), may also be used to extinguish the light from illuminator 18 at any time after illuminator 18 has been activated by control circuit 16.

Proximity detection for some applications may be used to change the state of illuminator 18 in other ways than simply on/off. For example, proximity could be used to increase the brightness of the illuminator for a prescribed period of time or change the color of the emitted light. The intensity of illuminator 18 might generally be set at an arbitrary value of L to generate sufficient illumination for mood/contour lighting. Upon detection of proximity, the intensity of illuminator 18 may be increased by the control circuit to 5×L or 10×L and remain at the elevated level until the prescribed termination (timeout, secondary proximity detection, etc.). Photosensor 12 may be used to control the on/off status of illuminator 18 in its lower intensity by activating the light source at the low intensity when a prescribed level of darkness is detected. Alternatively, illuminator 18 could be turned on in its low intensity state at all times.

For illuminators having adjustable color (such as a binary complementary LED illuminator or an RGB LED illuminator, for instance), the activation event (proximity detection) could switch the source from one color to another permanently or until a termination event occurs (timeout, secondary proximity detection, etc.). In the case of a binary complementary system comprising amber and blue-green LEDs whose combined emissions form white illumination, the base or starting color might be amber and the complement (blue-green) might be activated by the activation event, thereby changing the emitted illumination color from amber to white for a prescribed period (i.e., until a termination event occurs such as a timeout, secondary proximity detection, or external disable input). An example of a binary complementary LED illuminator is disclosed in U.S. Pat. No. 5,803,579, the disclosure of which is incorporated herein by reference. If illuminator 18 included an RGB LED combination, a similar scheme can be employed to switch between red illumination in its base state to white illumination in its activated state. Both of these color state switching schemes would have advantages in that they provide nominal, low illumination in a night-vision-friendly wavelength band in the base state and switch to fuller photopic illumination levels of white light in the activated state. The dimmer, "scotopic-friendly" base state may be one lux or lower of amber, red, or blue light, or just enough light for an observer to generally perceive the presence or contours of objects in the environment immediately surrounding the improved illuminator and the observer. The brighter "photopic" activated state may produce illumination of five lux up to several hundred lux of white or colored light. The brighter activated state is thus suitable beyond presence or contour perception and fully enables recognition, reading, and other tasks requiring more light and/or a larger zone of illumination, as well as tasks requiring better color rendition.

The proximity detector of the present invention preferably operates by principle of photo optical feedback with correlated double sampling. The photo optical feedback principle requires that the object to be detected must have a diffuse reflectance greater than one percent and/or a specular reflectance at the Snell angle (with respect to the emitter and detector) of greater than one percent. This includes almost all real objects.

Figure 2A:
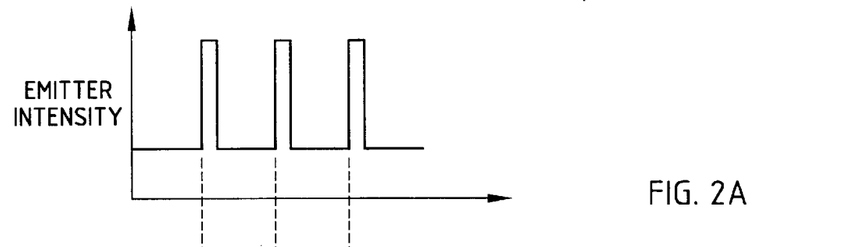
FIG. 2A is a plot of the intensity of radiation emitted from the radiation emitter shown in FIG. 1.
Figure 2B:
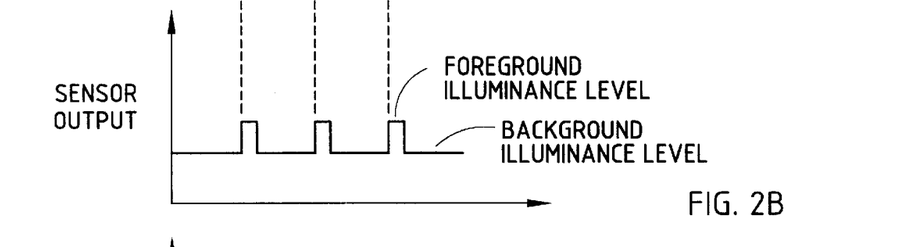
FIG. 2B is a plot of the sensed foreground and background illumination sensed by the photosensor of the structure shown in FIG. 1.
Figure 3:
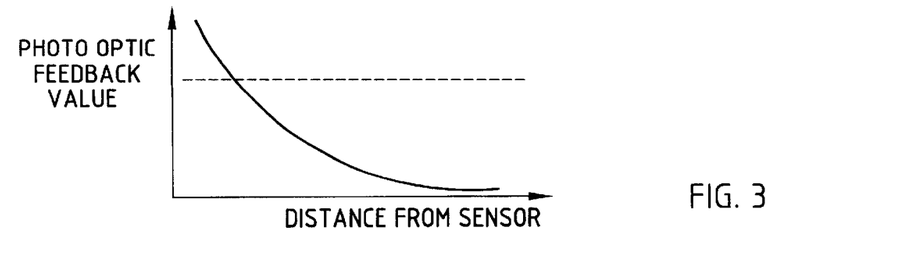
FIG. 3 is a plot of the photo optical feedback value as a function of the distance of an object to the photosensor of the structure shown in FIG. 1.

To detect nearby presence of an object, control circuit 16 first samples the signal from the sensor without activating radiation emitter 10. This creates a "background" illumination value. An example of such a background illumination signal is shown in FIG. 2B. Then, control circuit 16 energizes radiation emitter 10 causing it to emit a short pulse of optical energy, as also illustrated in FIG. 2A. Simultaneously, control circuit 16 integrates the signal received from photosensor 12. This integrated signal from photosensor 12 created during the synchronous on-pulse of emitter 10 creates a "foreground" illumination value. An example of the foreground illumination value is shown in FIG. 2B. The difference between the foreground value and the background value may be derived via analog or digital electronics or computed in a microprocessor. This difference represents the photo optical feedback value. The photo optical feedback value will be zero for situations where all objects in the sensor field of view are at infinity or if all objects in the sensor field of view nearer than infinity have zero reflectance. The photo optical feedback value for real, partially reflecting objects nearer than infinity will be finite and positive and will increase exponentially as the object nears the emitter and sensor as depicted in FIG. 3.

To use this photo optical feedback value as a trigger that enables or disables a device controlled by control circuit 16, which powers radiation emitter 10, a threshold value is established. If the photo optical feedback value exceeds the threshold value, then this can be used to enable, disable, or flip-flop the state of an input to control circuit 16, which, in turn, turns illuminator 18 on, increases the brightness of illuminator 18, changes its color, turns it off, or makes it dimmer. The photo optical feedback value would increase if an activation occurred by moving an object (such an operator's hand) near the sensor and emitter. At some distance greater than zero, the photo optical feedback from the activation target will reach and exceed the predetermined threshold value, thus initiating the trigger event (enable, disable, etc.) prescribed by the system logic.

By relying on the difference between the "foreground" illuminance value and the background illuminance value, as described above, to compute the photo optical feedback level, the present invention substantially minimizes impact of ambient light level on the system's proximity detection capability.

For best results, the system should be configured such that both radiation emitter 10 and photosensor 12 are oriented with their optical axes pointed within the same hemisphere, preferably, parallel to one another. Emitter 10 and photosensor 12 should be proximal to one another, spaced no further apart, preferably, than the minimum distance required for reliable proximity detection. Greater spacing may be operable and still within the scope of the present invention.

When the device is employed to control an illuminator, illumination of five lux or more at a target zone of some predetermined distance is preferably provided by the illuminator.

While the invention has generally been discussed with respect to intentional activation of illuminator 18, it is also possible that this device could be used for security purposes to detect movement of an object within the vehicle. For example, if the alarm is activated (such as by means of locking the doors) and if the proximity detector of the present invention detects presence of an object, control circuit 16 could be programmed to cause illuminator 18 to flash and may otherwise transmit a signal to the alarm system of the vehicle to generate other appropriate alarms.

While the most preferred embodiment is to incorporate the inventive proximity switch in a rearview assembly, the present invention may be implemented in other places of a vehicle to activate interior illumination as may be provided through map lamps, dome lamps, door lights, etc. Additionally, the present invention may be employed to activate a puddle lamp or an approach lamp in or adjacent the outside mirror of a vehicle, as well as back-up lamps, etc. The invention could also be incorporated in outdoor security lamps, porch lamps, overhead street lamps, and the like. The present invention could further be incorporated in virtually any form of illuminator or other electronic device.

Figure 4:
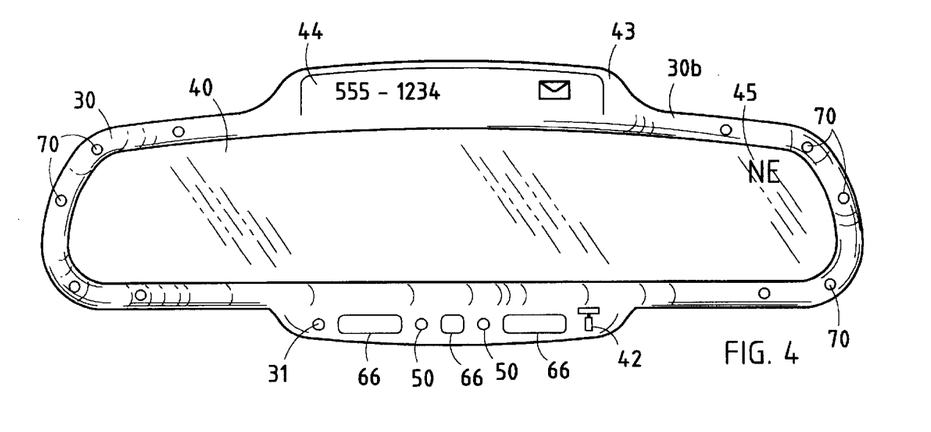
FIG. 4 is a front elevational view of a rearview mirror assembly constructed in accordance with an alternative embodiment of the present invention.
Figure 5:
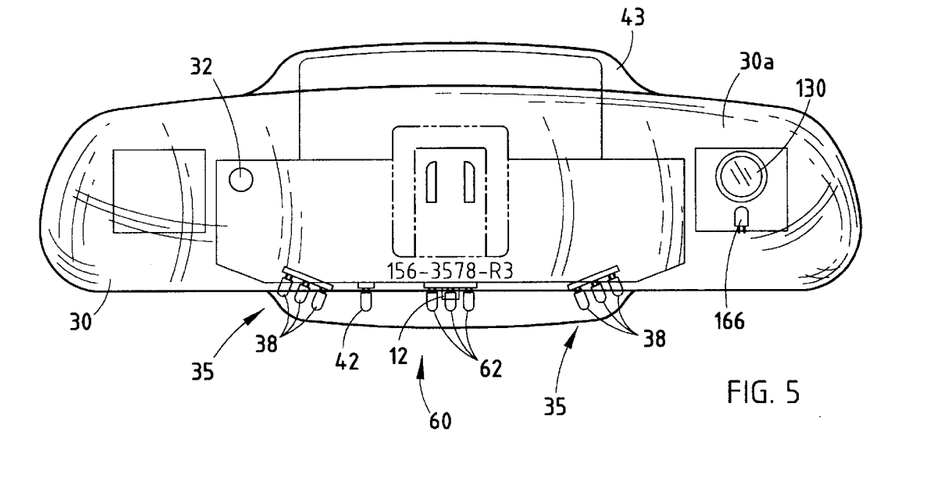
FIG. 5 is a rear elevational view of the rearview mirror assembly shown in FIG. 4.
Figure 6:
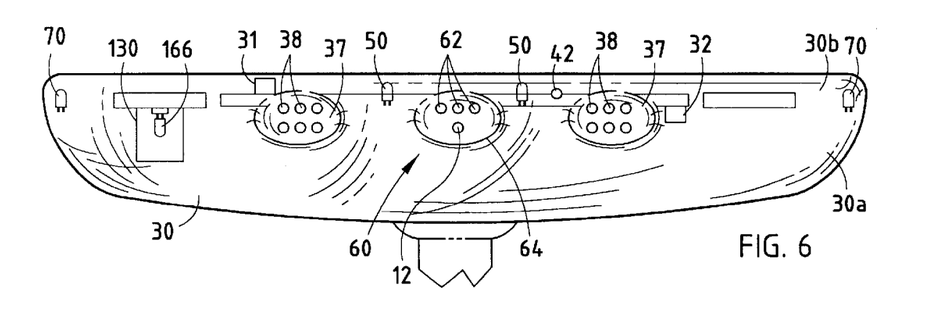
FIG. 6 is a bottom elevational view of the rearview mirror assembly shown in FIGS. 4 and 5.

The rearview assembly of the present invention may employ a transparent housing. An example of a rearview assembly having a transparent housing 30 is shown in FIGS. 4–6. Transparent housing 30 may include a rear casing 30a and a bezel 30b that are sealed together during final assembly. Preferably, both rear casing 30a and bezel 30b are transparent. However, either one may be opaque. Additionally, bezel 30b and rear casing 30a may have different color tints.

A transparent mirror housing offers many advantages over a conventional black opaque rearview mirror housing. For an electrochromic mirror, conventional black opaque mirror housings often include an aperture in the front of the bezel for allowing light from rearward vehicle headlights to reach a glare sensor mounted in the housing. Another aperture is also provided in the back of the mirror housing to allow light to reach an ambient light sensor that is also mounted in the mirror housing. Each of these apertures may be eliminated by using the transparent mirror housing of the present invention since the glare sensor 31 and ambient light sensor 32 may be mounted behind the outer walls of the transparent mirror housing. By eliminating these apertures, the sensors are better protected from electrostatic discharge and environmental contaminants, such as smoke, and from cleaning fluids used to clean the mirror and windshield. Yet another advantage is that mirror housing 30 may be made of a material that functions as a spectral filter to filter unwanted light in front of sensors 31 and 32. Additionally, the size constraints of the sensors are removed and the sensor size may be increased since there would be no need to provide a corresponding increase in the size of the aperture. The transparent housing may additionally be configured to function as an optical element in front of the sensor. For example, the transparent housing may function as a diffuser to diffuse the light prior to reaching the sensor. Additionally or alternatively, the transparent housing may be configured with an optical lens provided in the housing wall itself with the sensor positioned with its optical axis passing through the lens portion of the housing. The lens may be configured to function as a collimator lens, a wide angle lens, etc. Sensors 31 and 32 may be CdS, CMOS active pixel, photodiode, phototransistor, or CCD sensors or the like.

Figures 7, 8A:
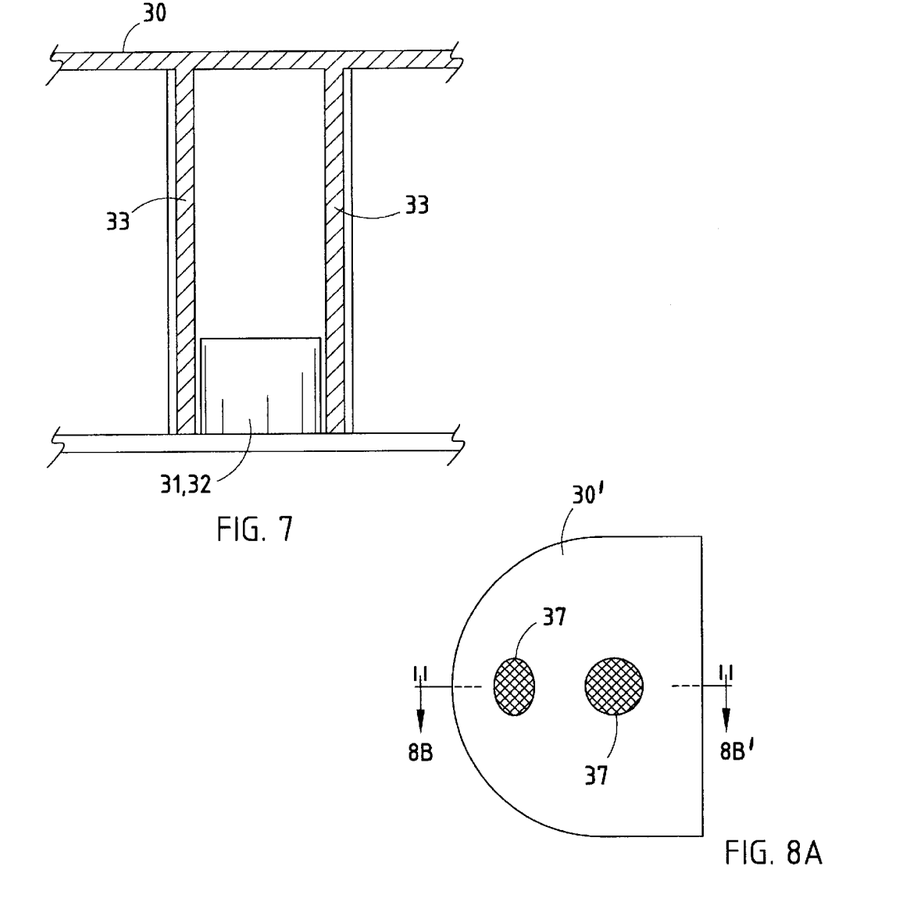
FIG. 7 is a cross-sectional view of a portion of a transparent housing constructed in accordance with the present invention.
FIG. 8A is a side elevational view of an exterior rearview assembly constructed in accordance with the present invention.

As shown in FIG. 7, a baffle is preferably provided between the inner wall of the transparent housing and the sensor 31, 32 so as to restrict the viewing angle of the sensor and thereby prevent stray light from various angles from reaching the sensor. Baffle 33 may be an integrally molded extension of housing 30 or it may be a separate molded piece that is subsequently secured to one or both of housing 30 or an internal circuit board on which the sensor is mounted. If the baffle 33 is separately molded, it is preferable that it is molded out of an opaque material, whereas if the baffle is an integral extension of the housing, it may be preferable to paint either or both of the inner or outer surfaces of the baffle portion.

It will be appreciated by those skilled in the art that the configurations shown and described above with respect to sensors 31 and 32 may equally be employed for implementing a camera such as a CMOS camera or a PIR detector such as the type used for occupant/intruder detection.

Figure 8B:
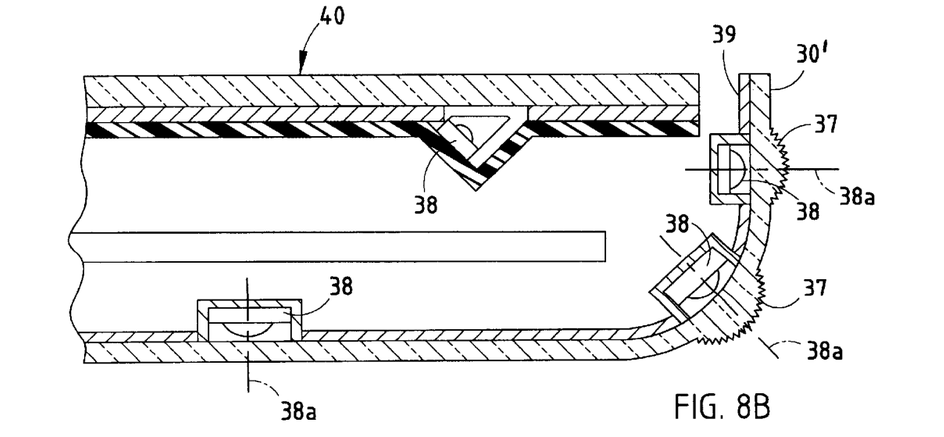
FIG. 8B is a cross-sectional view of the exterior rearview assembly shown in FIG. 8A taken along line 8B–8B'.

Other advantages of using a transparent mirror housing result when map lights 35 (FIGS. 5 and 6) are incorporated in the mirror housing. Previously, a pair of apertures was required in the opaque mirror housing and transparent lenses were mounted across such apertures. With a transparent mirror housing, lenses 37 may be integrally formed in mirror housing 30. This eliminates parts that must be assembled and provides for a more watertight assembly. Light sources 38 of the map lamps project light through lenses 37. FIG. 8A is a side view of an outside rearview assembly having a transparent housing 30' and a plurality of lenses 37 formed therein in association with a plurality of light sources 38. FIG. 8B is a cross-sectional view of the outside rearview assembly taken along line 8B–8B'. As illustrated, the optical axes 38a of light sources 38 are preferably aligned with the optical axes of lenses 37. It should be noted that the lenses may be formed on the inner or outer surfaces of housing 30'. As illustrated in FIG. 8B, a coating of paint 39 may be selectively applied to the inside or outside surface of housing 30' thereby defining windows in which the lenses are formed and through which light may be emitted or received. In the embodiment shown in FIGS. 8A and 8B, light sources 38 are utilized as turn signal indicator lights. It will be appreciated, however, that such light sources may function as illuminators and, in particular, when implemented in an inside rearview assembly, the light sources may function as map lights, center console light illuminators, mood/contour lights, or as other indicator lights.

The light sources 38 are preferably LEDs, such as those disclosed in U.S. Pat. No. 5,803,579; commonly assigned U.S. patent application Ser. No. 09/426,795, entitled SEMI-CONDUCTOR RADIATION EMITTER PACKAGE, filed on Oct. 22, 1999, by John K. Roberts et al., now U.S. Pat. No. 6,335,548; U.S. patent application Ser. No. 09/835,278, entitled RADIATION EMITTER DEVICES AND METHOD OF MAKING THE SAME, filed on Apr. 13, 2001, by John K. Roberts et al., now U.S. Pat. No. 6,521,916; and U.S. patent application Ser. No. 09/723,675, entitled LIGHT EMITTING ASSEMBLY, filed on Nov. 28, 2000, by John K. Roberts et al., the entire disclosures of which are incorporated herein by reference.

To the extent that light sources 38 may include multiple emitters that emit light of different colors that are to be subsequently mixed, such as the white light emitting binary complementary light sources disclosed in the above-mentioned U.S. Pat No. 5,803,579, lenses 37 may be configured to aid in the mixing of the light from the emitters. An example of one such suitable mixing lens is disclosed in U.S. Provisional Patent Application No. 60/270,054, entitled RADIATION EMITTER DEVICE HAVING A MICRO-GROOVE LENS, filed on Feb. 19, 2001, by John K. Roberts, the entire disclosure of which is incorporated herein by reference.

Yet another aperture is often provided in the rear of an opaque rearview mirror housing to allow electrical connection to diagnostic or other external circuits. By making the mirror housing transparent, an IRDA-type transceiver 42 could be mounted to the printed circuit board mounted in the housing and utilized to transmit and receive data to/from an external device. IRDA transceiver 42 could also be utilized to transmit GPS data to a laptop or other portable computer, a personal digital assistant (PDA), or to transmit and receive data with other electrical components of the vehicle. Thus, electrical cabling other than power and ground would not need to be run to the mirror and any data transmission that would be required could be accomplished by a wireless IR link. The IRDA transceiver could include a discrete LED as shown in FIGS. 4–6 or an IR LED chip provided in a multi-chip LED that may alternatively function as a map lamp. The IRDA transceiver 42 data interface may also be used for transmitting/receiving diagnostic data, firmware upgrades to the firmware located in the rearview assembly or in other vehicle components, map data that may be uplinked to the vehicle navigational system, and trip computer data that may be downlinked to a portable electronic device.

Some conventional rearview mirror assemblies incorporate displays mounted either behind the mirror or in an extension of the mirror housing adjacent the mirror. When the display is located behind the mirror, some of the viewable reflective area of the mirror is sacrificed for the display. When the display is not behind the mirror but is adjacent the mirror, a separate transparent cover must be secured in front of the display, thereby requiring additional parts and assembly and also introducing another potential site where moisture could enter the mirror and damage the mirror and/or electronic circuitry in the housing.

By using the transparent housing of the present invention, a display 44 may be mounted inside housing 30 behind a flat extension 43 adjacent the mirror 40. In this manner, none of the viewing area of mirror 40 is sacrificed and the addition of display 44 does not present additional sites of moisture ingress. It should further be noted that such a display 44 may be provided in addition to any display 45 that may be mounted behind the mirror. Such an additional display 44 would be beneficial in mirror assemblies such as those discussed above since the mirror assembly is the source for much more information that could be supplied to the driver and other vehicle occupants. Furthermore, information that is otherwise displayed in other locations (i.e., clock, speed, radio station, etc.) may now be displayed in the rearview mirror assembly.

By placing the display behind a transparent portion of housing 30, the housing provides a protective window against electrostatic discharge, moisture, cleaners, and dirt. Additionally, the housing may serve as a spectral filter for the display, such as a color shift filter for a vacuum fluorescent display or a contrast enhancement filter. Display 44 may be a backlit or edge lit display or other liquid crystal display, vacuum fluorescent display, FED, plasma or other LED matrix, OEL, or PEL displays.

As disclosed in commonly assigned U.S. Pat. Nos. 5,923, 027 and 5,837,994, the rearview mirror assembly may incorporate a moisture sensor and/or a headlight/tail light sensor used to control windshield wipers, window defrosters, and vehicle headlights and tail lights. Such image sensors/cameras typically include a lens mounted in an aperture formed in the rear of the mirror housing. When mounted in the transparent housing of the present invention, the aperture may be eliminated and the lens may be integrated into the mirror housing. This allows the imaging sensor 130 and any supplemental light source 166 to be mounted directly on the motherboard inside the transparent housing (See FIGS. 5 and 6).

Figure 9:
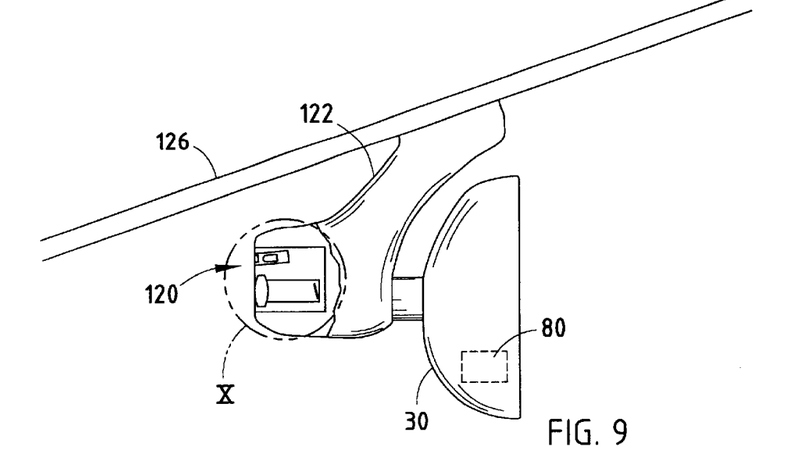
FIG. 9 is a side elevational view of a rearview assembly in partial cross section, constructed in accordance with an alternative embodiment of the present invention.
Figure 10:
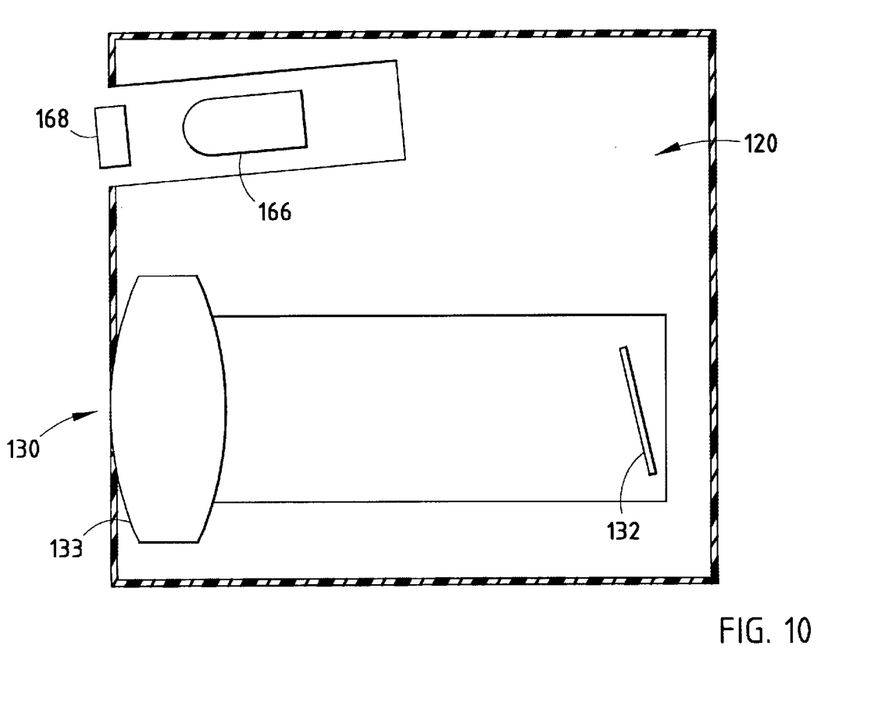
FIG. 10 is a close-up cross-sectional view of the portion of the rearview assembly shown in FIG. 9.

As shown in FIGS. 9 and 10, a camera/sensor system 120 may be mounted in the mounting structure 122 of a rearview assembly. The same structure may likewise be mounted in or otherwise attached to housing 30. In general, the system 120 shown in FIG. 9 may be used for sensing moisture on windshield 126 of the vehicle in the manner disclosed in U.S. Pat. No. 5,923,027. As shown in FIG. 10, system 120 includes an image sensor 130 including a lens 133 and an image sensor array 132 for sensing an image of the vehicle windshield. A processor may be provided in housing 30 to perform a moisture detection algorithm based upon the sensed images. A supplemental illuminator 166 and an associated lens 168 may be provided to illuminate the portion of the window being imaged. Both lenses 168 and 133 may be made integral with the transparent walls of housing 30 or transparent walls of a transparent mounting structure 122. As noted above, image array sensor 132 may alternatively or additionally be used for sensing headlamps of oncoming vehicles or tail lamps of preceding vehicles such that the information obtained from these images may be used to control the headlamps of the vehicle in which the present invention is installed. As yet another alternative or additional feature, image array sensor 132 may be a high dynamic range, forward-looking camera that is sensitive to either near or far infrared for use in a collision avoiding system. As yet another alternative or additional feature, the camera may be used for adaptive cruise control systems.

In conventional opaque mirror housings, an aperture is often provided in the front of the housing to allow light from an LED indicator light to escape the housing. If the transparent mirror housing of the present invention is employed, no additional aperture need be provided for such indicator lights 50 (FIGS. 4 and 6). Moreover, because additional apertures would not be required for additional LED indicator lights, the mirror assembly could be employed to provide numerous other indications to the vehicle operator. For example, LEDs 50 (or other light devices) could be contained in the mirror housing and illuminated to indicate that a telephone call is incoming, e-mail or voice mail has been received, there is a call waiting, the vehicle alarm is armed, etc. LEDs may also be provided to provide pulsed indication of microphone feedback. Such indications may be made by backlighting an applique printed on the mirror housing using a lightpipe or the like. Also, the whole mirror housing may be illuminated.

Another feature that may be readily incorporated into a rearview mirror assembly having a transparent mirror housing is a center console light 60. Such a console light may provide a certain amount of soft illumination from the bottom of the rearview mirror assembly downward onto the center floor console where a shift lever may be positioned. This console light may be left permanently on, particularly when LEDs are utilized as the light source, or may be activated along with other lights as part of an illuminated entry lighting system. As illustrated in FIGS. 5 and 6, console light 60 includes a plurality of LEDs 62 positioned behind a lens 64. Such LEDs 60 may emit light having different colors and may emit binary complementary colors such that when they are all activated, the illumination emitted from the LEDs overlaps and creates white light. Such an illumination system is disclosed in U.S. Pat. No. 5,803,579 and the above-referenced U.S. patent application Ser. No. 09/426,795, the entire disclosures of which are incorporated herein by reference.

The console light may include one or more multi-chip LEDs that incorporate LED chips that emit light of different colors. Such colors are preferably binary complementary so as to be capable of forming white light illumination. In a preferred embodiment, one of the discrete LEDs or LED chips within a discrete LED emits amber light. Another discrete LED or LED chip may emit blue-green light. In this manner, the soft illumination may be provided by activating only the amber LED or LED chip. Additionally, the current supplied to the amber LED or amber LED chip may be reduced so as to reduce the intensity of the light emitted from that LED or LED chip. The blue-green LEDs or LED chips may subsequently be automatically or manually activated. For example, if the amber LED is continuously on, activation of a remote keyless entry key fob or insertion of the vehicle key in the door lock may trigger an automatic response whereby the blue-green LEDs are energized and, optionally, the intensity of the amber LEDs is increased. Alternatively, the intensity of the console light may be increased manually using a number of different techniques so as to provide an additional map lamp, or a primary map lamp if map lamps 35 are not otherwise included in the mirror.

One way in which the intensity of the console light may be manually increased is by providing an additional push-button 66 on housing 30. Alternatively, a proximity switch and a sensing electrode may be mounted in the chin of the mirror near the channel mount, which is sensitive to the touch or near-proximity of a human hand. Such switches are well known and commonly referred to as a "capacitive switch," which senses a change in the field projected by the proximity switch electrode. Another technique is to provide a light sensor 12, which is preferably in the form of an active pixel sensor as disclosed in U.S. patent application Ser. No. 09/307,191, entitled PHOTODIODE LIGHT SENSOR, filed on Apr. 13, 1999, now U.S. Pat. No. 6,359,274, the entire disclosure of which is incorporated herein by reference. Sensor 12 is provided to sense the reflection of light emitted from the amber LEDs as reflected off a person's hand when waved in close proximity to the bottom of the mirror housing 30 in the manner described above.

Although the above-noted console light is disclosed in the context of the transparent rearview assembly housing, it will be appreciated by those skilled in the art that the inventive console light could otherwise be incorporated in an assembly with a non-transparent housing.

The transparent housing of the present invention may also contain illumination devices 70 about the periphery of the bezel that, when illuminated, provide an illuminated vanity mirror.

Another advantage of utilizing a transparent mirror housing is for lot traceability. Presently, the lot number is printed on the circuit board in the mirror housing, which would require that the housing be disassembled to read the lot number. With a transparent housing, the lot number 75 may be simply read from the circuit board through the housing. Similarly, the lot number or other information about the mirror may be provided in the form of a bar code printed inside the mirror housing such that it may be read right through the mirror housing.

The transparent housing of the present invention also enables manufacturers to readily assemble and inspect the rearview assemblies to ensure that all snap connections are properly engaged.

Yet another advantage of using a transparent housing is that the housing may be tinted different colors. Thus, the housing may be color matched to the interior or exterior color of the vehicle in which it is installed. Further, any LED mounted in the housing may be color matched to the mirror housing and the vehicle colors. It may also be advantageous to add a UV stabilizer to the material molded into the transparent housing so as to protect the internal components from damage due to direct exposure to sunlight.

As shown in FIG. 9, the transparent rearview assembly housing may also enable a laser radar detector 80 to be installed in the housing 30. Positioning a laser radar detector within the rearview assembly is particularly advantageous in that it provides a clear direct line of sight forward of the vehicle and rearward of the vehicle. By providing a transparent housing, the radar detector 80 may be incorporated within the housing 30 and detect laser light as commonly used by many law enforcement agencies. A rearward facing laser radar detector may also be provided in the housing 30 such that the detector detects light through a transparent portion of the bezel, an etched-out portion of a mirror 40, or is directed through a transflective portion of the mirror. Examples of transflective electrochromic rearview mirrors are disclosed in commonly assigned U.S. patent application Ser. No. 09/311,955, entitled ELECTROCHROMIC REARVIEW MIRROR INCORPORATING A THIRD SURFACE METAL REFLECTOR AND A DISPLAY/SIGNAL LIGHT filed on May 14, 1999, by William L. Tonar et al., now U.S. Pat. No. 6,356,376, the entire disclosure of which is incorporated herein by reference. An integral rearward/forward facing laser radar detector 80 may be employed. It is also possible that an aperture or transparent window be provided in an opaque rear casing to allow a forward facing laser radar detector to detect light when all or part of housing 30 is not transparent. Indicator lights 50, audible indicators, and/or manual user switches for detector 80 may be incorporated in housing 30.

Figure 11:
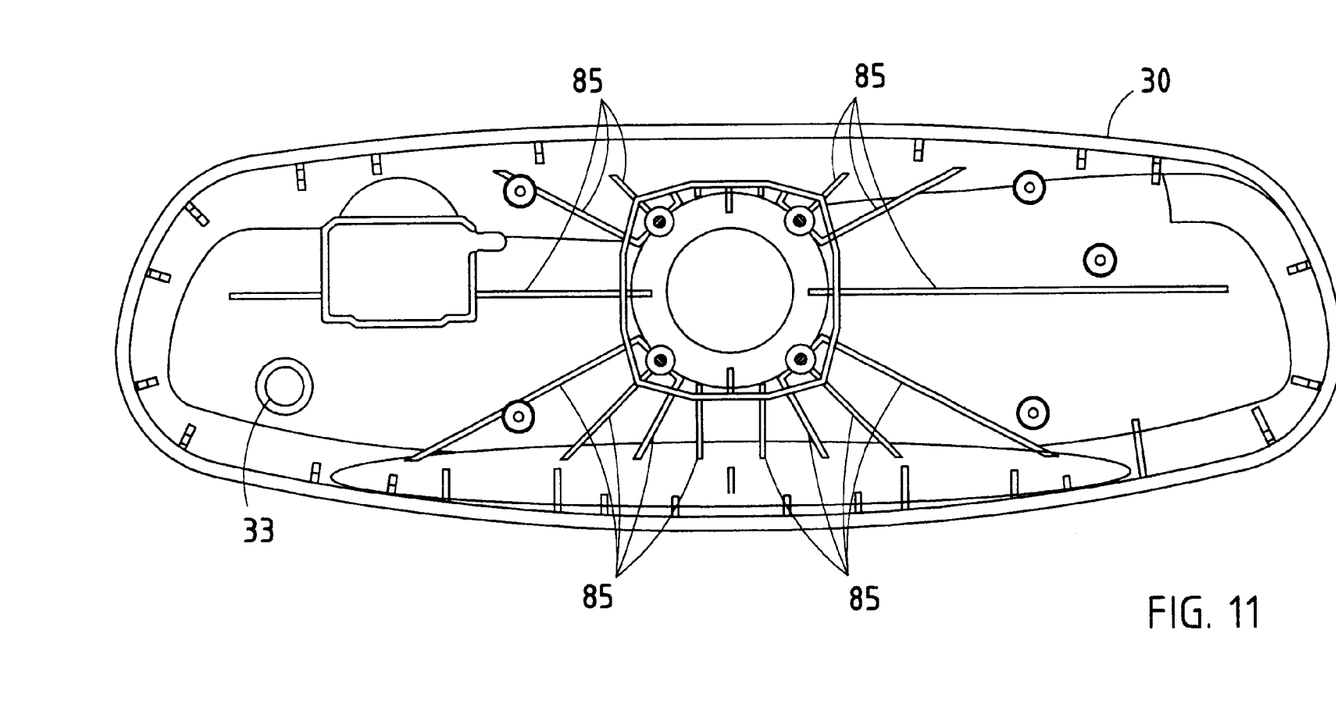
FIG. 11 is a front elevational view of a casing portion of the transparent housing constructed in accordance with the present invention.

As shown in FIG. 11, the rear casing 30a of housing 30 may include several integrally formed strengthening ribs 85, which provide added strength to the rearview assembly. Such ribs are preferably integrally molded with casing 30a and are also transparent.

As mentioned above, the rearview housing 30 of the present invention is preferably "transparent" meaning that the housing is optically transparent (i.e., substantially transparent to UV, IR, and visible light). Preferably, housing 30 is at least substantially transparent to visible light. In some applications, however, it may only be necessary that the housing be transparent to IR radiation. Likewise, it may not be necessary for the housing to be transparent to IR radiation.

It will be appreciated that less than all of the housing need be transparent to obtain some or all of the above advantages.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A proximity switch comprising:
   a radiation emitter for emitting radiation;
   at least one photosensor for detecting light levels near said radiation emitter; and
   an electronic circuit for energizing said radiation emitter and for receiving and processing signals from said photosensor so as to perform a specified function upon detecting an object that causes the radiation emitted from said radiation emitter to be reflected back to said photosensor.

2. The proximity switch of claim 1, wherein said electronic circuit is coupled to an illuminator assembly and wherein said specified function is to activate said illumination assembly.

3. The proximity switch of claim 1, wherein said radiation emitter emits non-visible radiation.

4. The proximity switch of claim 1, wherein said radiation emitter emits visible light.

5. The proximity switch of claim 1, wherein said radiation emitter emits visible light and is part of an illuminator.

6. A vehicle illuminator system comprising:
   a lamp module for emitting light and configured for mounting to a vehicle;
   a radiation emitter for emitting radiation;
   at least one photosensor for detecting light levels near said radiation emitter; and
   an electronic circuit for energizing said radiation emitter and for receiving and processing signals from said photosensor so as to cause said lamp module to emit light upon detecting an object that causes the radiation emitted from the radiation emitter to be reflected back to said photosensor.

7. The vehicle illuminator system of claim 6, wherein said radiation emitter is disposed in said lamp module.

8. The vehicle illuminator system of claim 6, wherein said photosensor is disposed in said lamp module.

9. The vehicle illuminator system of claim 6, wherein said radiation emitter emits visible light.

10. The vehicle illuminator system of claim 6, wherein the brightness of said radiation emitter changes when lamp module emits light.

11. The vehicle illuminator system of claim 6, wherein said lamp module emits light of two different levels of brightness.

12. The vehicle illuminator system of claim 6, wherein said radiation emitter includes an LED.

13. The vehicle illuminator system of claim 6, wherein said radiation emitter includes two LEDs that selectively emit binary complementary white light.

14. A rearview assembly for a vehicle comprising:
   a mounting structure adapted to be mounted to a vehicle and including a housing;
   rearward viewing means for providing a rearward view to a vehicle occupant;
   a light module disposed in said housing;
   a radiation emitter for emitting radiation;
   at least one photosensor for detecting light levels near said radiation emitter; and
   an electronic circuit for energizing said radiation emitter and for receiving and processing signals from said photosensor so as to cause said light module to emit light upon detecting an object that causes the radiation emitted from the radiation emitter to be reflected back to said photosensor.

15. The rearview assembly of claim 14, wherein said rearward viewing means is a mirror.

16. The rearview assembly of claim 15, wherein said mirror is an electrochromic mirror.

17. The rearview assembly of claim 15, wherein said rearward viewing means further includes a display.

18. The rearview assembly of claim 14, wherein said rearward viewing means includes a display.

19. The rearview assembly of claim 14, wherein said radiation emitter is mounted in said housing.

20. The rearview assembly of claim 14, wherein said photosensor is mounted in said housing.

21. The rearview assembly of claim 14, wherein said housing is transparent.

22. An interior rearview assembly for a vehicle comprising:
   a mounting structure configured to be secured to the vehicle in proximity to an upper portion of a windshield of the vehicle;
   a transparent housing supported on said mounting structure, said transparent housing being transparent to visible light; and
   rearward viewing means for providing a rearward view to the driver of the vehicle, said rearward viewing means being supported by said transparent housing.

23. The interior rearview assembly of claim 22, wherein said rearward viewing means comprises a mirror.

24. The interior rearview assembly of claim 23, wherein said mirror is an electrochromic mirror.

25. The interior rearview assembly of claim 22, wherein said housing includes a transparent bezel surrounding said rearward viewing means.

26. The interior rearview assembly of claim 22 and further comprising at least one illuminator light disposed within said transparent housing.

27. The interior rearview assembly of claim 26, wherein said at least one illuminator light is a map light.

28. The interior rearview assembly of claim 26, wherein said at least one illuminator light is disposed to illuminate a central floor console.

29. The interior rearview assembly of claim 26, wherein said at least one illuminator light is configured to provide contour/mood lighting.

30. The interior rearview assembly of claim 22 and further comprising at least one indicator light disposed within said transparent housing.

31. The interior rearview assembly of claim 22 and further comprising a display disposed within said transparent housing.

32. The interior rearview assembly of claim 31, wherein said display is an alphanumeric display.

33. The interior rearview assembly of claim 22 and further comprising an ambient visible light sensor disposed within said transparent housing.

34. The interior rearview assembly of claim 22 and further comprising an image sensor disposed within said transparent housing.

35. The interior rearview assembly of claim 34, wherein said image sensor is configured to sense images of the vehicle windshield so as to enable moisture to be detected on the vehicle windshield.

36. The interior rearview assembly of claim 34, wherein said image sensor is configured to sense images forward of the vehicle so as to enable detection of headlamps of oncoming vehicles and tail lights of leading vehicles to thereby control the vehicle headlamps.

37. A rearview assembly for a vehicle comprising:
   a mounting structure configured to be secured to the vehicle;
   a transparent housing supported on said mounting structure, said transparent housing being transparent to infrared light;
   rearward viewing means for providing a rearward view to the driver of the vehicle, said rearward viewing means being supported by said transparent housing; and
   an infrared data interface disposed in said transparent housing for enabling wireless communication with an electronic device within the vehicle.

38. The rearview assembly of claim 37, wherein the electronic device is one of a personal digital assistant and a portable computer.

39. The rearview assembly of claim 37, wherein said infrared data interface is configured to transmit diagnostic data to the electronic device.

40. The rearview assembly of claim 37, wherein said infrared data interface is configured to receive firmware upgrades from the electronic device.

41. The rearview assembly of claim 37, wherein said infrared data interface is configured to receive navigation map data from the electronic device.

42. The rearview assembly of claim 37, wherein said infrared data interface is configured to transmit trip computer data to the electronic device.

43. The rearview assembly of claim 37, wherein said rearview assembly is an interior rearview assembly and said mounting structure is configured to mount to the vehicle proximate the front windshield.

44. The rearview assembly of claim 37, wherein said rearward viewing means includes a mirror.

45. A rearview assembly for a vehicle comprising:
   a mounting structure configured to be secured to the vehicle;
   an optically transparent housing supported on said mounting structure;
   rearward viewing means for providing a rearward view to the driver of the vehicle, said rearward viewing means being supported by said transparent housing; and
   an image sensor disposed in said transparent housing, wherein said transparent housing is transparent to the radiation to which said image sensor is sensitive.

46. The rearview assembly of claim 45, wherein said image sensor and said transparent housing are arranged such that said image sensor images a scene through said transparent housing.

47. The rearview assembly of claim 46, wherein said transparent housing includes an integrally formed lens disposed in front of said image sensor.

48. The rearview assembly of claim 45, wherein said transparent housing includes an integrally formed baffle disposed around said image sensor.

49. The rearview assembly of claim 45, wherein said image sensor is coupled to a headlamp control circuit that controls the headlamps of a vehicle in response to images obtained by said image sensor.

50. The rearview assembly of claim 45, wherein said image sensor is coupled to a windshield wiper control circuit that controls the windshield wipers of a vehicle in response to images obtained by said image sensor.

51. A rearview assembly for a vehicle comprising:
a mounting structure configured to be secured to the vehicle;
an optically transparent housing supported on said mounting structure;
rearward viewing means for providing a rearward view to the driver of the vehicle, said rearward viewing means being supported by said transparent housing; and
information provided within said transparent housing that is readable by one or both of a machine reading device and a human from outside said transparent housing.

52. The rearview assembly of claim 51, wherein said transparent housing is transparent to visible light.

53. The rearview assembly of claim 51, wherein said information is at least partially encoded in a bar code.

54. The rearview assembly of claim 51, wherein said information is at least partially encoded in machine-readable symbology.

55. The rearview assembly of claim 51, wherein said information includes a part identification code.

56. A rearview assembly for a vehicle comprising:
a mounting structure configured to be secured to the vehicle;
an optically transparent housing supported on said mounting structure;
rearward viewing means for providing a rearward view to the driver of the vehicle, said rearward viewing means being supported by said transparent housing;
an optical element disposed within said transparent housing and having an optical axis; and
a lens integrally formed in said transparent housing, wherein said optical element is disposed with its optical axis passing through said lens.

57. The rearview assembly of claim 56, wherein said optical element is an optical sensor.

58. The rearview assembly of claim 56, wherein said optical element is a light source.

59. The rearview assembly of claim 56, wherein said optical element is an image sensor.

60. The rearview assembly of claim 56, wherein said transparent housing includes a substantially opaque coating on an inside surface except for the region in which said lens is defined.

61. A rearview assembly for a vehicle comprising:
a mounting structure configured to be secured to the vehicle;
an optically transparent housing supported on said mounting structure, said transparent housing including a plurality of integrally molded strengthening ribs;
rearward viewing means for providing a rearward view to the driver of the vehicle, said rearward viewing means being supported by said transparent housing; and
an optical element disposed within said transparent housing and having an optical axis.

62. The rearview assembly of claim 61, wherein said rearview assembly is an interior rearview assembly and said mounting structure is configured to mount to the vehicle proximate the front windshield.

63. The rearview assembly of claim 61, wherein said rearward viewing means includes a mirror.

64. A rearview assembly for a vehicle comprising:
a mounting structure configured to be secured to the vehicle;
a housing supported on said mounting structure;
rearward viewing means for providing a rearward view to the driver of the vehicle, said rearward viewing means being supported by said housing; and
a laser radar detector provided in said housing,
wherein at least one of said housing and said rearward viewing means is at least partially transparent to wavelengths of light to which said laser radar detector is sensitive.

65. The rearview assembly of claim 64, wherein said rearward viewing means is a mirror.

66. The rearview assembly of claim 65, wherein said mirror is a partially transmissive mirror.

67. The rearview assembly of claim 65, wherein said mirror is an electrochromic mirror that is partially transmissive.

68. The rearview assembly of claim 65, wherein said housing is at least partially transparent.

69. The rearview assembly of claim 68, wherein both said housing and said mirror are at least partially transparent.

70. The rearview assembly of claim 64, wherein said housing is at least partially transparent.

71. The rearview assembly of claim 64, wherein said rearview assembly is an interior rearview assembly and said mounting structure is configured to mount to the vehicle proximate the front windshield.

* * * * *